Feb. 27, 1934.   S. E. THOMAS   1,948,601
MOUSE AND RAT TRAP
Filed July 27, 1933   2 Sheets-Sheet 1
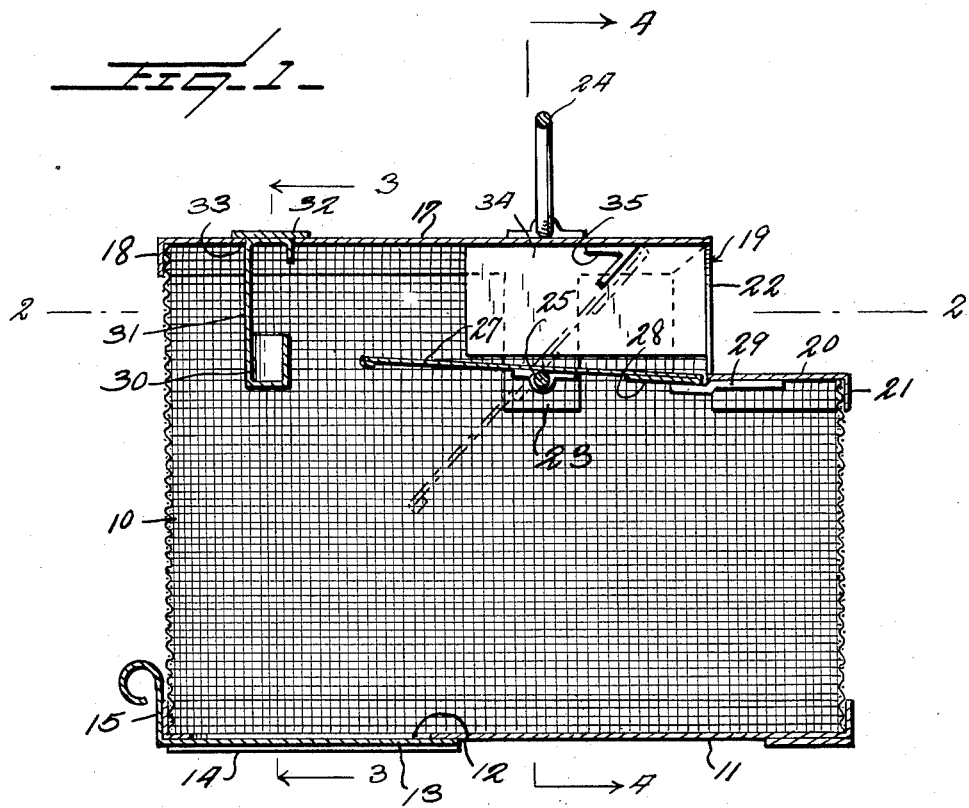
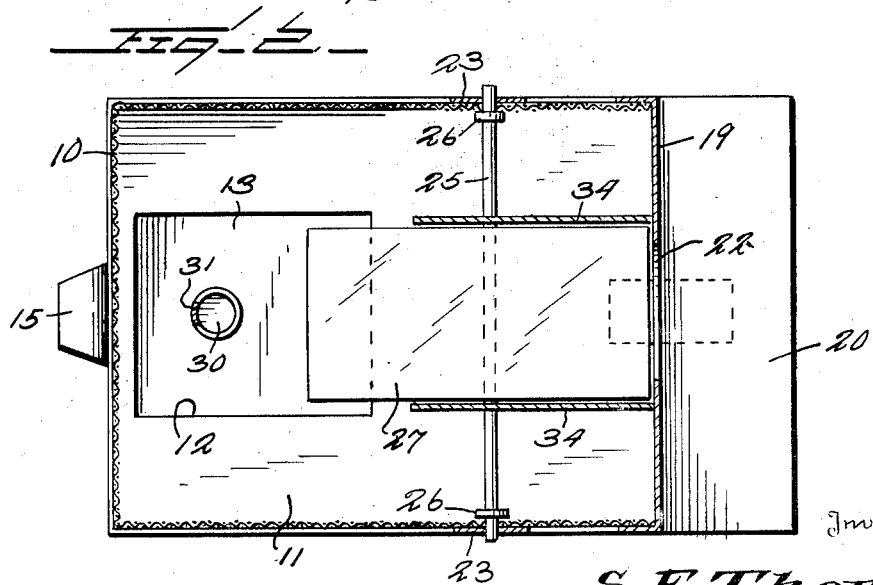
Inventor
S. E. Thomas
By Watson E. Coleman
Attorney

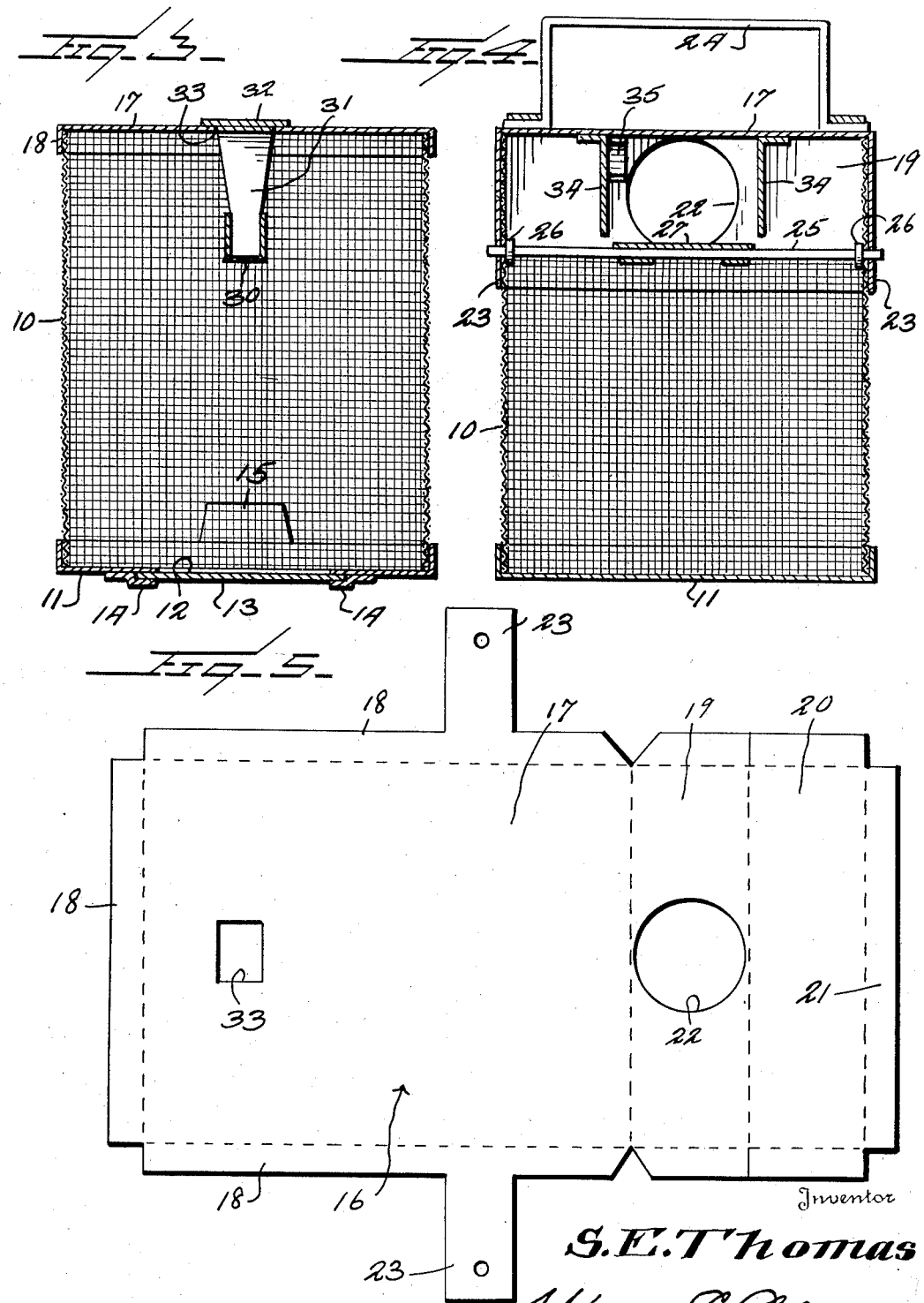

Patented Feb. 27, 1934

1,948,601

UNITED STATES PATENT OFFICE 1,948,601

MOUSE AND RAT TRAP

Sanford E. Thomas, Spencer, Ind.

Application July 27, 1933. Serial No. 682,495

2 Claims. (Cl. 43—69)

This invention relates to traps and particularly to that class of traps in which a pivoted platform is provided overweighted by the arrival of a mouse or rat upon the end of the platform and discharging the animal into the body of the trap.

The general object of this invention is to provide a trap of this character which is very simply made, may be cheaply constructed and which is so arranged that the animal cannot by any possibility get back on to the platform and get out of the trap after he has once been discharged by the tilting platform.

A further object is to provide a trap of this character which provides for an entrance on to the platform which is always open and which has the similitude of a hole, the latter being particularly attractive to rats or mice, the platform being so arranged that the animal may look across the platform to the bait which is apparently within easy reach and see that there is no apparent danger.

Other objects have to do with the detailed construction of the trap and its body as will appear more fully hereinafter.

The invention is illustrated in the accompanying drawings, wherein:—

Figure 1 is a vertical sectional view of a trap constructed in accordance with my invention;

Figure 2 is a section on the line 2—2 of Figure 1;

Figure 3 is a section on the line 3—3 of Figure 1;

Figure 4 is a section on the line 4—4 of Figure 1;

Figure 5 is a detailed view of the blank from which the top of the trap is formed.

Referring to these drawings, 10 designates the body of the trap which is preferably made of reticulated material such as wire mesh or the like having, of course, sufficient strength for the purpose. The wire mesh body is bent to define a rectangular figure as shown in Figure 2. The bottom of the body is closed by a sheet of metal 11 having an aperture 12 cut out therein and closed by a sliding door 13, this sliding door being mounted in the guides 14 shown in Figure 3. The door, of course, has a handle at one end designated 15 which limits the inward movement of the door but permits the door to be opened when it is desired to discharge the rat or mouse. As will be seen from Figure 1, the upper portion of the body is stepped so as to provide an upper level and a lower level. The top of the body is closed by an imperforate metal plate or sheet shown in Figure 5 and designated generally 16.

The main portion of this sheet designated 17 extends across the upper level of the body and is flanged at its sides and one end as at 18. At 19, the sheet extends downward and then forward as at 20, the portion 20 being formed with the marginal flanges 21 which extend downward to engage the sides of the body 10. The downwardly extending wall 19 is provided with an opening 22 and the flanges 18 are formed with the opposed downwardly extending ears 23. This cap or top 16 may be soldered, welded or otherwise attached to the reticulated body of the trap and is preferably provided with the swinging handle 24 so that the trap may be carried.

Extending through the ears 23 and freely rotatable in these ears is a shaft 25 having the stops 26 which prevent any sliding movement of the shaft. Mounted upon the shaft for oscillation therewith is a platform 27 which is normally disposed in approximately horizontal position as shown in Figure 1 with one end brought in close approximation to the portion 19 of the plate 16 and on a level with the lower edge of the opening 22. This portion of the platform is slightly weighted by a weight 28 and this end of the platform is normally supported by means of a stop 29 which is attached to the portion 20 of the plate 16 and extends inward beneath the platform.

Disposed beyond the platform and in spaced relation thereto is a bait holder designated 30 shown as in the form of a cup supported by a vertical web 31 attached to a head 32. The web 31 is insertible through an opening 33 formed in the top plate 16 and the head 32 closes this opening entirely and constitutes a handle whereby the bait cup may be withdrawn. The bait cup or holder is disposed immediately opposite the inner end of the platform but in spaced relation thereto so that the animal must come to the end of the platform and reach out for the bait, thus overbalancing the platform and discharging the animal into the body of the trap.

In order to prevent the animal from getting back upon the forward portion of the platform, that is, that portion of the platform between the pivot or shaft 25 and the support 29, I provide two wings or partitions 34 which are attached to or formed with the top plate 16 and which are spaced apart a distance slightly greater than the width of the platform and which extend down in close approximation to the shaft 25. Thus the animal is guided as it were on to the inner end of the platform and when the animal has fallen into the trap, it is impossible for him to climb back on to the outer end of the platform. The best he can do is to climb on to the inner end of the platform and under these circumstances, the platform will tilt and again discharge the animal into the trap. Thus the animal is absolutely prevented from escaping while at the same time as soon as the animal has tilted the platform and fallen into the trap, the platform returns to its horizontal position and thus resets itself, ready for another rodent.

The outer end of the platform is limited in its upward movement by a limiting stop 35 attached to the under side of the portion 17 and against which the outer end of the platform strikes when the platform is tilted. This prevents the platform from tilting to such a degree as to cause it to stick.

It will be seen that my trap stands open at all times so as to permit the animals to have free and easy access into the passageway defined by the wings 34 without any obstruction at all. The bait basket is disposed inside of the trap and is placed in front of the tipping platform in order to coax the animal to try and obtain the food. The tripping platform works automatically in resetting the trap after each catch.

It will be seen that all of the movable parts of this device are mounted upon the sheet metal top or cap of the trap and that this sheet metal top may be readily stamped out and easily formed. There is no strain on the reticulated metal which forms the body of the trap and all the operative parts are supported from the plate 16. By using wings, 34, disposed on each side of the trip platform and by providing the stop 35, the animal is absolutely prevented from regaining its liberty after sliding down the platform to the bottom of the trap inasmuch as he cannot get back to the entrance except by again climbing on to that portion of the platform which will overbalance it. An animal has a natural instinct to enter a room through a hole or small passageway and I have taken advantge of this instinct in the construction of my trap as I have provided a relatively small hole 22 through which the animal can enter and a passageway defined by the wings 34, which passageway seems to be entirely unobstructed and easy of access and exit. The food seems to be within easy reaching distance of an animal entering the passageway. By putting the entrance below the top of the trap and using sides of reticulated screening material, the animal can easily reach the entrance. Inasmuch as animals already in the trap are alive and moving about, the animal about to enter the trap will not be frightened as is the case where an animal is killed and left at the entrance of the trap. The trap is, of course, to be emptied through the aperture 12 in the bottom of the trap by withdrawing the sliding door.

I claim:—

1. A trap of the character described, comprising a body formed of wire mesh and having a bottom, the upper part of the body being stepped, a cap of sheet metal resting upon the upper end of the body and connected thereto and extending over the upper end of the body, the cap having a downwardly extending vertical portion and beyond the vertical portion a horizontal portion, the vertical portion being provided with a relatively small opening, the cap having depending ears inward of said opening, a shaft supported by said ears, a platform mounted upon said shaft for tilting movement, the outer end of the platform adjacent said inlet opening being overweighted, a stop carried by the horizontal portion of the top and disposed beneath the inlet opening, and adapted to support the platform in an approximately horizontal position, a bait holder removably supported by said cap and extending downward into said body and disposed on an approximate level with the inner end of the platform but in spaced relation thereto, and guard wings extending downward from the cap on each side of the tiltable platform and extending to the vertical wall of the cap.

2. A trap of the character described comprising a body formed of wire mesh and having a bottom, a cap of sheet metal having downwardly extending flanges embracing the body and attached thereto, said cap adjacent one end being formed with a vertical wall provided with an opening and the cap having depending ears inward of said opening, a tiltable platform pivotally mounted upon said ears in alinement with the lower portion of said opening, the platform being overweighted at its outer end, a stop carried by the cap immediately beneath the opening and against which the overweighted end of the platform will engage when the platform is in a horizontal position, vertical guard walls carried by the cap and disposed on each side of the platform to prevent an animal from climbing back upon the overweighted end of the platform, the cap having an opening, and a bait holder having a vertical web and a head, the weight at its lower end carrying a cup, the bait holder being insertible through the opening in the cap and being supported by the head with the cup in approximate alinement with the platform but in horizontal spaced relation thereto.

SANFORD E. THOMAS.